United States Patent [19]

Vukovich, Jr.

[11] Patent Number: 4,461,616
[45] Date of Patent: Jul. 24, 1984

[54] CERAMIC HEAT TREATMENT REGULATING APPARATUS AND METHOD

[75] Inventor: Milan Vukovich, Jr., Delaware County, Ohio

[73] Assignee: The Edward Orton Jr., Ceramic Foundation, Westerville, Ohio

[21] Appl. No.: 469,829

[22] Filed: Feb. 25, 1983

[51] Int. Cl.³ .......................... F26D 7/00; F27B 1/26; F27B 9/40; F23N 1/00
[52] U.S. Cl. .............................. 432/18; 236/15 BG; 432/24; 432/36; 432/43
[58] Field of Search ...................... 432/18, 24, 36, 37, 432/43; 236/15 BG

[56] References Cited

U.S. PATENT DOCUMENTS

| | | | |
|---|---|---|---|
| 3,301,481 | 1/1967 | Amy et al. | 236/46 |
| 3,338,680 | 8/1967 | Martens | 432/43 |
| 3,607,660 | 9/1971 | Kumper | 201/1 |
| 3,855,452 | 12/1974 | Flasza | 219/486 |
| 3,901,437 | 8/1975 | Harkins | 236/15 B |
| 3,985,712 | 10/1976 | Garst | 236/46 |
| 4,003,803 | 1/1977 | Schmidt-Balve | 202/262 |
| 4,114,024 | 9/1978 | Donner | 236/15 BG |
| 4,172,555 | 10/1979 | Levine | 236/46 R |
| 4,234,124 | 11/1980 | Yarrow | 236/15 BG |
| 4,286,465 | 9/1981 | Thomae | 73/342 |

Primary Examiner—John J. Camby
Attorney, Agent, or Firm—Banner, Birch, McKie & Beckett

[57] ABSTRACT

An efficient method for using a periodic kiln to heat ceramic material to a state of maturation, and the apparatus for carrying out the method, duplicate the action of pyrometric cones. In a microcomputer, data is stored describing the relationship between rates of temperature increase and deformation temperatures for several numbered pyrometric cones. The kiln operator selects the cone number for use in the firing operation and then activates both the apparatus and the kiln's heating elements. Using a thermocouple, the microcomputer periodically measures kiln temperature and calculates the average rate of temperature increase inside the kiln (the rate need not be controlled). The rate is then used, in conjunction with the stored data, to determine the temperature at which the ceramic material will have matured. If the present temperature in the kiln is greater than or equal to this maturation temperature, the microcomputer sounds an alarm or shuts off the heating elements.

17 Claims, 8 Drawing Figures

CERAMIC HEAT TREATMENT REGULATING APPARATUS AND METHOD

BACKGROUND OF THE INVENTION

This invention relates to an apparatus and method for controlling the amount of heat treatment given to a ceramic material which is being matured by heating. Specifically, it relates to the determination of when the ceramic material has received the proper amount of heat treatment, enabling a person or the apparatus itself to stop the heating process.

During the manufacture of ceramic articles, a firing or heating operation is necessary in order to cause the otherwise plastic ceramic material to maintain its shape. Heating is carried out (usually in a kiln) for lengths of time and at temperatures which will cause the ceramic object to reach a certain state of maturation which may be defined by various criteria such a porosity, density, or shrinkage. Regardless of which criterion is used, the ceramicist selects a condition of the material as "matured" and must then undertake to heat the material to, but not beyond, that point. While this invention is not concerned with defining the state of maturation of a ceramic material, it is concerned with regulating the heat treatment which the material receives so that the chosen state of maturation is attained efficiently. Too little heat treatment may result in a finished product which has insufficient strength or other undesirable qualities, while too much heat treatment wastes energy in heating the kiln and slows the rate at which the finished articles can be produced.

There are many apparatus for measuring the ambient temperature within a periodic kiln or for controlling the maximum temperature to which the kiln is heated or the rate at which the interior temperature rises. A typical apparatus of this type is described in Harkins, U.S. Pat. No. 3,901,437. The furnace operator selects both a maximum temperature and a rate of temperature increase (a "soak" period at maximum may also be provided), and the system activates the furnace heating components to cause the temperature to increase according to the selected values. Feedback is provided through a thermocouple which supplies a signal representative of kiln temperature.

It is apparent that this and similar apparatus suffer from the drawback that nowhere is an indication given of the state of maturation of the ceramic ware. The ceramicist using only these devices must therefore know beforehand, or through trial and error, what maximum temperature, rate of temperature increase, and soak time will mature a ceramic article to the desired degree.

It is well known in the ceramic arts that numbered pyrometric cones may be used during a firing operation to give an indication of the condition of the ceramic material. Cones neither measure nor control kiln temperature but react to the combination of temperatures and times to which they are exposed to provide an indication of the amount of heat treatment they have received. The indication provided by cones is their deformation, since they are composed of a fusible material. Consequently, a given cone may be used only once. This is the chief drawback of using pyrometric cones to indicate heat treatment.

Different values of heat treatment are indicated by deformation of different members of a particular set of cones (for example, the Orton Standard Pyrometric Cones manufactured by The Edward Orton, Jr. Ceramic Foundation of Westerville, Ohio). Also, for a given rate of temperature increase in the kiln, one may speak of a maturation *temperature* (for the piece being fired) or a deformation *temperature* (for the cone), rather than a value of heat treatment. Maturation or deformation temperature, however, is only meaningful in connection with a given rate of temperature increase. The deformation temperatures of some cones have been measured for various values of rate of temperature rise, and a few piecewise linear approximations of these relationships are shown in FIG. 1. Consequently, if a controlled rate of temperature increase can be maintained in a kiln (using, for example, the device of the Harkins patent), and if the desired degree of maturation of ceramic ware in the kiln is known to correspond to deformation of one of these cones, the operator may simply stop the firing operation at the proper deformation temperature and be assured of a matured ceramic article. Since an experienced kiln operator should easily be able to determine the proper cone number for a particular firing operation, the chief disadvantage of this method of determining when to end the firing is the need for an apparatus which can increase kiln temperature at a constant rate.

It is also possible to determine the end point of a ceramic maturing operation which is conducted at various heating rates, using only time and temperature information. This method makes use of the Arrhenius equation, a well-known relationship between time, temperature, and the extent of reaction. By integration, the duration of heating at various temperatures is reduced to an equivalent time at a single temperature; and if the maturation time at that temperature is known, heating can be stopped when the equivalent time equals the known maturation time. This system is described in Cooper, C. F., "Heat Work," 80 *Trans. J. British Ceramic Society* 60 (1981), and is also used for the curing of rubber, as explained, for example, in Smith, U.S. Pat. No. 3,819,915. Integration and calculation of an equivalent maturation time eliminate the need to control the rate of temperature increase; therefore, devices employing the Arrhenius equation may be used in spite of variations in the rate at which kiln temperature increases. Indeed, the rate need not even be measured or calculated. This advantage is achieved, however, only at significant cost. In the first place, one of the variables of the Arrhenius equation is activation energy. Any system based on the Arrhenius equation, therefore, requires the furnace operator to know, or discover through experimentation, the activation energy for the article being fired. Second, the nature of the calculation requires complex circuitry which not only carries out the mathematics of the equation and integrates equivalent times but also keeps track of kiln temperature at *every instant* during the firing.

SUMMARY OF THE INVENTION

It is an object of the present invention to develop an apparatus and method for heating ceramic materials to maturation in a periodic kiln without using pyrometric cones, employing instead a reusable device.

It is another object of the present invention to develop such an apparatus and method wherein the rate of increase of kiln temperature need not be controlled but may vary in any manner.

An additional object of the present invention is to provide such an apparatus and method wherein the condition of maturation of ceramic objects may be determined with reference to commercially available pyrometric cones so that a person experienced with pyrometric cones will be able readily to substitute for them the present invention. A related object is to provide such an apparatus and method which avoid the need to know the activation energy of the ceramic material being fired.

Another object of the present invention is to create such an apparatus and method which are simple, inexpensive, and easy to use.

The present invention employs a microcomputer to store the necessary relationships between the deformation temperatures of pyrometric cones and the corresponding rates of temperature increase. Using one of these relationships, and the instantaneous kiln temperature indicated by any suitable means (such as a temperature transducer), the microcomputer also performs the calculations which result in a determination of when the ceramic material has reached the desired state of maturation. The microcomputer calculates the average rate of temperature increase which the ceramic article has undergone during a defined period; and then it uses that average value to find, from the stored relationships, the deformation temperature of the selected pyrometric cone. The deformation temperature so found represents, for the given average rate of temperature increase, a particular value of heat treatment. If the current temperature of the ceramic article is not less than the deformation temperature, it is assumed that the heat treatment received by the ceramic article has matured it. The selected cone's deformation temperature is therefore treated as the maturation temperature for the ceramic object being heated. The operations of calculating average rate of temperature increase and finding the corresponding deformation temperature are repeated periodically while the kiln is being heated. When it first occurs, therefore, that kiln temperature has exceeded the corresponding deformation temperature for the selected cone, the kiln is shut off (or the operator is signalled to shut off the kiln) because further heating of the ceramic article would be wasteful of time and energy and possibly detrimental to the article itself.

By storing the relationships between rates of temperature increase and deformation temperatures of pyrometric cones, the present invention eliminates the need to use the actual cones. It does, however, enable a kiln operator, who is experienced in the use of cones for evaluating heat treatment of ceramics, to select a cone *number* just as he or she always would. Because the invention uses, in addition to the present temperature of the ceramic article, only the average rate of temperature increase, detailed knowledge of the actual historic temperature changes is unnecessary. Thus, the manner in which the kiln is heated is of no consequence, and temperature need not be controlled. (Of course, the heat treatment provided must be sufficient to mature the ceramic material.) As long as the kiln operator knows the number of the cone whose deformation represents the desired heat treatment, further information, such as the activation energy of the ceramic material, is unnecessary.

Various methods may be employed to determine a deformation temperature using a calculated rate or rates of temperature increase. For example, a single rate could be compared with the stored relationship to find a deformation temperature. Alternatively, the rates of temperature increase during different periods (which are themselves averages) may be stored and a single average calculated from these for comparison with the stored relationship. In some applications, such as where the heating rate is very irregular, it may be desirable to adjust the calculated rate using its first derivative, i.e., the rate of change of the rate of temperature increase. A number of rates of temperature increase would be stored and operated upon mathematically, for example by calculating their differences, to determine the first derivative. This would then be applied to the latest calculated rate, or to a rate derived from the stored rates, adjusting is so that it more accurately reflects the true average rate. Alternatively, the latest calculated rate, or a rate derived from the stored rates, could be used to determine an uncorrected maturation temperature, and the uncorrected maturation temperature could be corrected in accordance with the first derivative.

DETAILED DESCRIPTION OF THE PREFERRED EMBODIMENT

A. Main Loop

Figure 1:
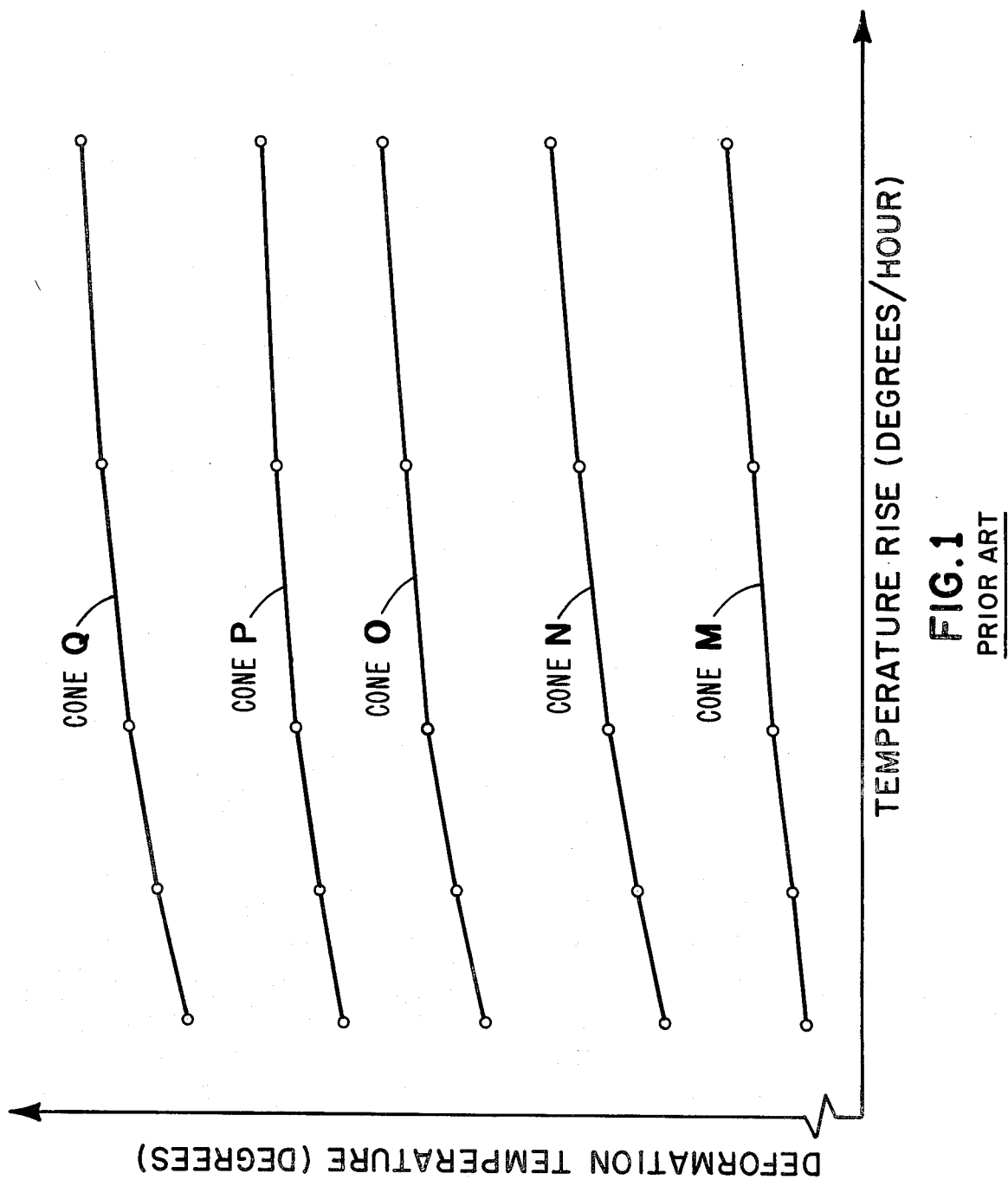
FIG. 1 is a graph of the measured relationships between rate of temperature increase (abscissa) and deformation temperature (ordinate) for some pyrometric cones.
Figure 2:
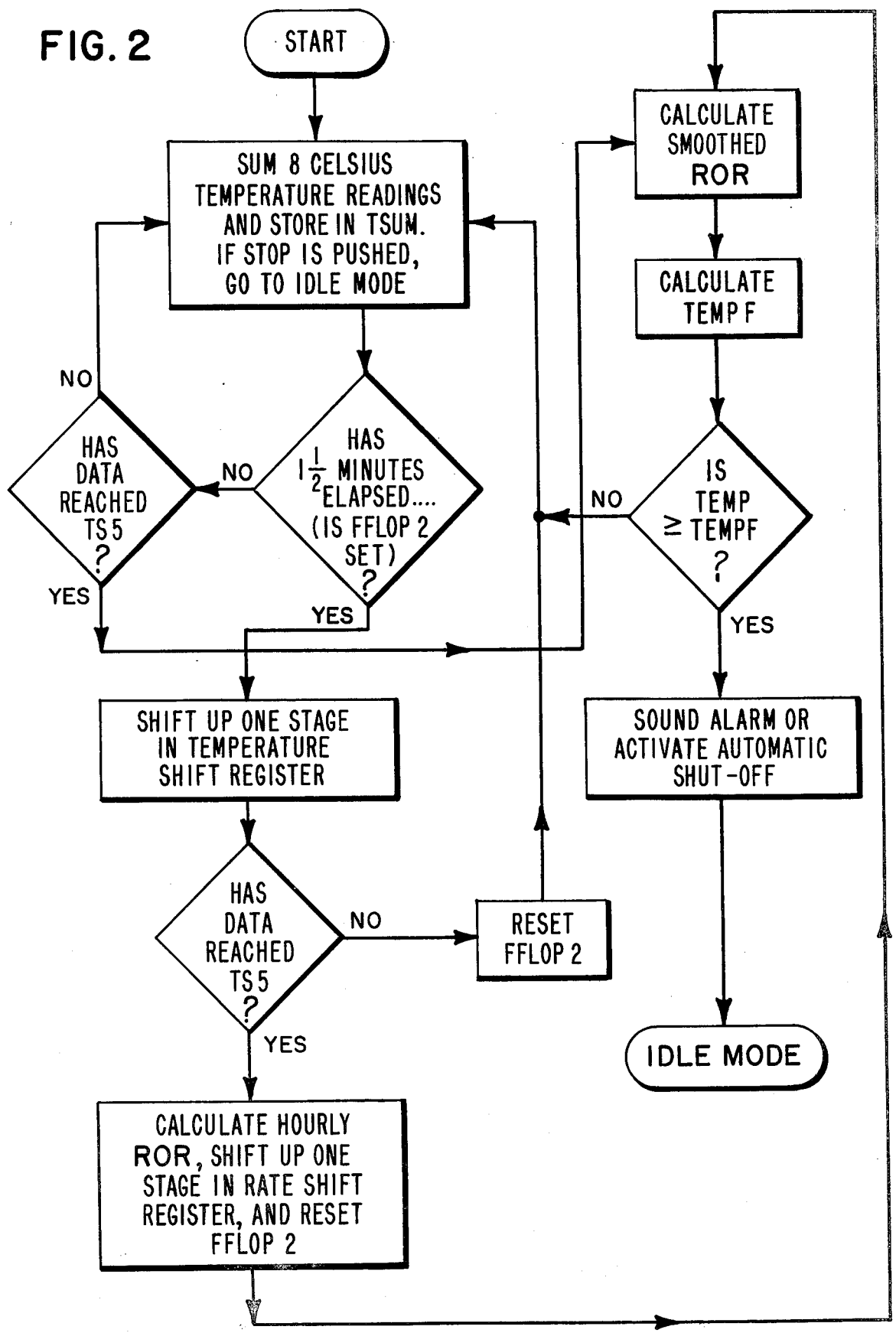
FIG. 2 is the flow chart for the main loop of the computer program used in this invention.

The heart of the preferred embodiment of the present invention is a microcomputer, whose program flow chart is shown in FIG. 2. Once the system is activated and the kiln begins heating, the microcomputer reads the temperature inside the kiln at intervals of 0.5s. Throughout the program, temperature readings are added in a storage location, which here will be called TSUM, until eight readings have been accumulated. However, this total is ignored unless the setting of a particular flag causes the computer to store the TSUM value in the first stage, TS0, of the temperature shift register.

The flag is called FFLOP2, and it is set every 1¼ minutes. If FFLOP2 is set, the TSUM value is stored in TS0 and all other values are shifted up one stage in the six-stage (TS0–TS5) register. TS5 must contain a temperature value for proper operation of the program; consequently, this temperature reading and shifting is all that occurs in the main loop during the first 7½ minutes (five shifts) of program operation.

Once TS5 is loaded with its first set of temperature readings, the rate of temperature rise, ROR, is calculated each time the temperature shift register is shifted, using the formula $$ROR = TS0 - TS5.$$

Because eight readings were added into each stage, and the time between TS0 and TS5 is one-eighth hour, an effective hourly rate results. Whenever ROR is determined, its value is entered into the first stage of the rate shift register, which has seven stages numbered RATE0 through RATE6. As the ROR value is placed in RATE0, of course, all other values are shifted up one stage. Each stage of the rate register, therefore, contains an effective hourly rate of temperature rise calculated over a 7½-minute period; and the individual 7½-minute periods represented in RATE0 through RATE6 overlap each of the adjacent stages by six minutes.

Whenever ROR is calculated and the rate register is shifted, a "smoothed rate of rise" is also determined. This is done by averaging RATE3 through RATE6 (the oldest four rate values). Smoothed rate of rise, therefore, is an effective hourly rate representing temperatures which occurred between 4½ and 16½ minutes ago. This delay is introduced to simulate the thermal momentum which a pyrometric cone would possess under the same circumstances, thereby more accurately representing the cone.

Once a value for smoothed rate of temperature rise is available, the deformation temperature, TEMPF, may be obtained from the relationship between rate of temperature rise and deformation temperature, for the selected cone number. These relationships, previously measured, have been approximated by straight lines and are stored as a table of m and k values for the generalized linear equation $$y = mx + k, \quad (2)$$

where y represents TEMPF, x represents smoothed rate of rise, m is the slope of the line, and k is the y-intercept. TEMPF is then compared with the latest available kiln temperature (TSUM/8) and, if TEMPF is smaller, an alarm is sounded to alert the kiln operator. If TEMPF is not smaller, the entire process is repeated from the beginning of the main loop.

B. Temperature Measurement

Figure 3:
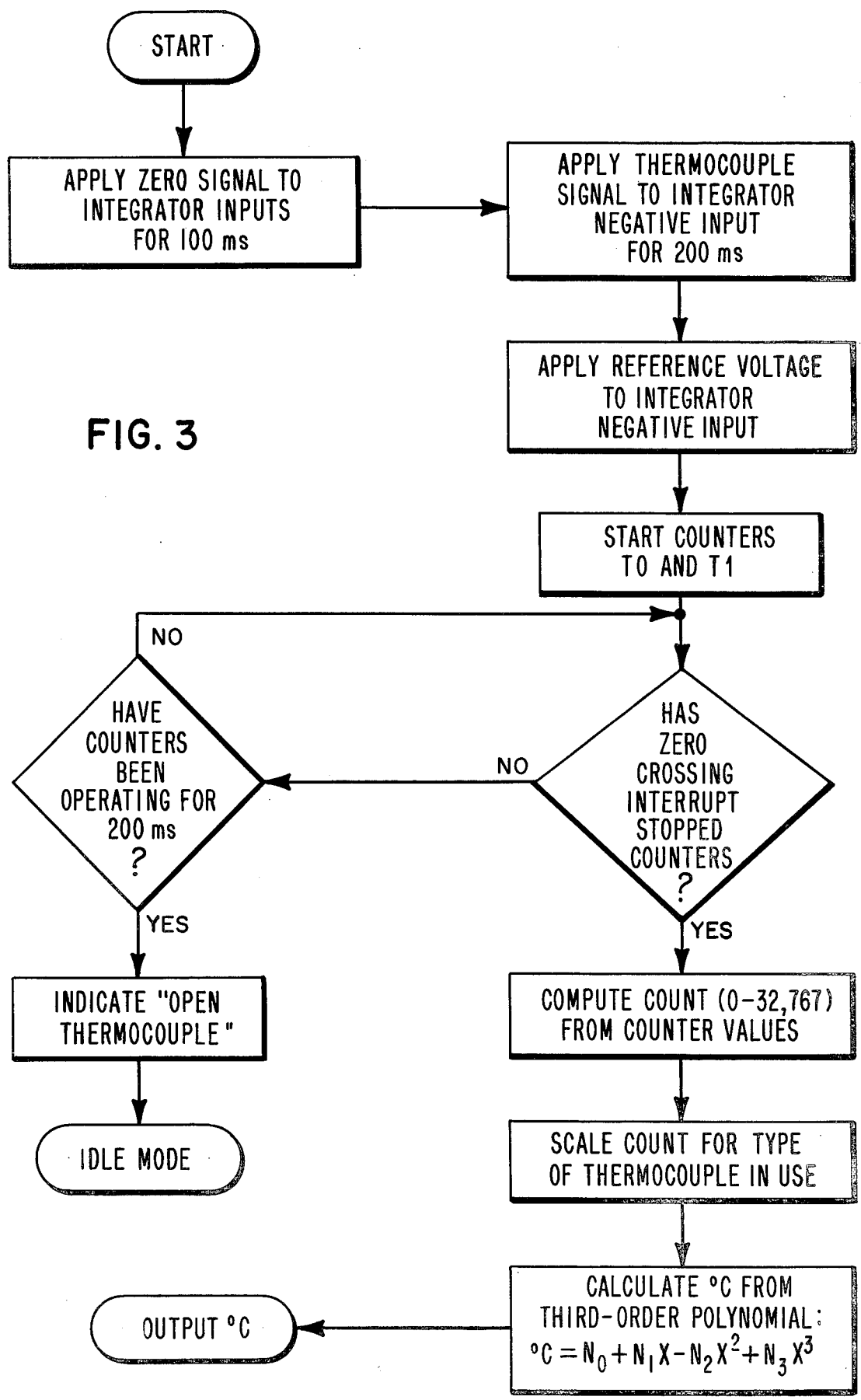
FIG. 3 is the flow chart for the temperature-determining portion of the computer program.
Figure 4:
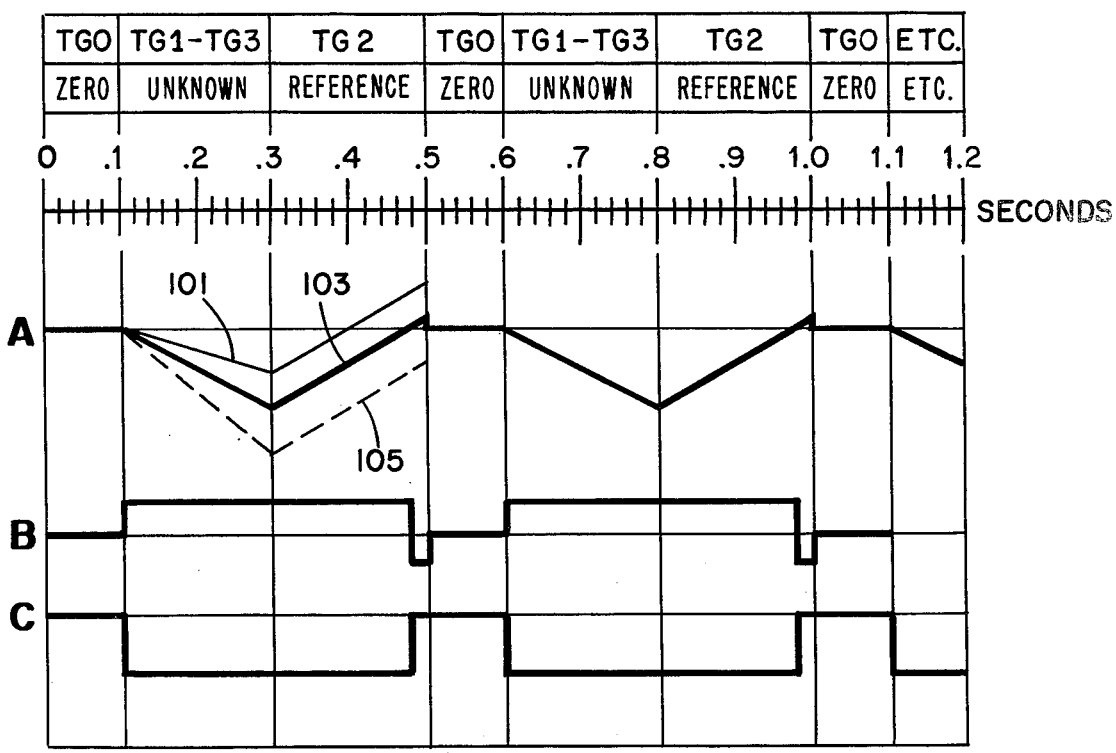
FIG. 4 shows the values of time-varying voltages at three points of the analogue portion of the circuit of the present invention.

Incoming temperature information from a thermocouple in the kiln arrives in analogue form and is converted to a digital quantity approximately every half second in the manner shown in FIGS. 3 and 4. Curve A of FIG. 4 is a graph of integrator output voltage vs. time. Before the analogue-to-digital (A-D) conversion begins, the circuit is reset by apply a zeroing or resetting signal (TG0) to both inputs of the integrator for 100 ms (from 0 to 0.1 on the graph). This appears as a zero output from the integrator. Next, the thermocouple signal (positive, either TG1 or TG3) is applied to the negative input of the integrator for 200 ms while a cold junction signal is applied to the positive input. The output is more or less (depending upon the input wave form) a descending ramp, the lowest point of descent varying with the magnitude of the input. At the end of the 200-ms period, a constant negative reference voltage (TG2) is substituted for the positive thermocouple voltage (the cold junction signal remains), causing the integrator output to rise at a steady rate. This is also continued for up to 200 ms. At the same time that the reference voltage is applied to the integrator, a 163,835 Hz counter is started. The counter is stopped (by a Zero Crossing Interrupt) when voltage A reaches zero. From FIG. 4, it is evident that the smaller the thermocouple signal, the sooner the counter will be stopped by the Zero Crossing Interrupt. For example, line 101 illustrates the signal obtained with a small thermocouple voltage, while line 103 shows the situation resulting from a larger thermocouple voltage. Therefore, the count is a digital representation of kiln temperature.

Although the system is designed so that there will be a zero crossing within the 200-ms period for any temperature within the capability of the device, it may happen that a thermocouple is broken and supplies no signal. In such a case, circuitry is provided which applies a very large voltage to the intergrator. When this occurs, as the dashed line 105 of FIG. 4 shows, there is no zero crossing during the 200 ms of reference voltage application, which causes an "open thermocouple" display to be activated, alerting the kiln operator to the malfunction. Curves B and C of FIG. 4 show the output voltages of the precomparator amplifier and the level shifter, respectively.

Either of two types of thermocouple may be ued in this invention. The type K Chromel/Alumel thermocouple, with a 40 uV/°C. temperature gradient, provides greater sensitivity but may be used up to a maximum of only 1300° C. Greater range, up to 1535° C., is available with the Type S Platinum/Platinum-10%-Rhodium thermocouple, but at the expense of a smaller (10.5 uV/°C.) temperature gradient.

C. Temperature Calculation

The counter mentioned above is actually a pair of counters within the microcomputer, T0 and T1, which count down synchronously. At the beginning of analogue-to-digital conversion (when the reference voltage is applied to the integrator's input), T0 and T1 are loaded with the values 200 and 199, and counting is started at the previously-mentioned 163,835 Hz rate. Therefore, the combination of values in T0 and T1 changes each 6.104 us, and each combination of T0 and T1 values represents an integer between 0 and 40,000. Only the values up to 32,767, however, are used for temperature information (the 163,835-Hz counters can divide 200 ms into 32,767 parts). If no zero crossing has occurred in 200 ms, the "open thermocouple" signal is activated.

At zero crossing, T0 and T1 are stopped and their values translated into the appropriate count between 0 and 32,767. This number is scaled according to the type of thermocouple, S or K, being used. (It is divided by 512 for the K thermocouple or by 2048 for the S thermocouple.) The scaled value is then converted into a Celsius temperature reading by substituting it for x in the following third-order equation:

$$°C = N_0 + N_1 x - N_2 x^2 + N_3 x^3 \quad (3)$$

There are six sets of the coefficents $N_0$, $N_1$, $N_2$ and $N_3$; the set chosen by the program depends upon both the type of thermocouple being used and the temperature, as shown in Table 1 below in which the values of the coefficients are given to three significant figures.

TABLE 1

|  |  | Temperature Range | | |
|---|---|---|---|---|
|  |  | below 200° C. | 200°–700° C. | above 700° C. |
| Type S | $N_0$ | 0.487 | 26.1 | 13.5 |
|  | $N_1$ | 176 | 127 | 126 |
|  | $N_2$ | 40.4 | 4.41 | 3.16 |
|  | $N_3$ | 9.91 | 0.209 | 0.0759 |
| Type K | $N_0$ | 0.181 | −11.5 | 2.73 |
|  | $N_1$ | 25.0 | 27.3 | 25.2 |
|  | $N_2$ | 0.226 | 0.175 | 0.0857 |

TABLE 1-continued

| | Temperature Range | | |
|---|---|---|---|
| | below 200° C. | 200°–700° C. | above 700° C. |
| $N_3$ | 0.0221 | 0.00268 | 0.00148 |

D. Apparatus

Figure 5:
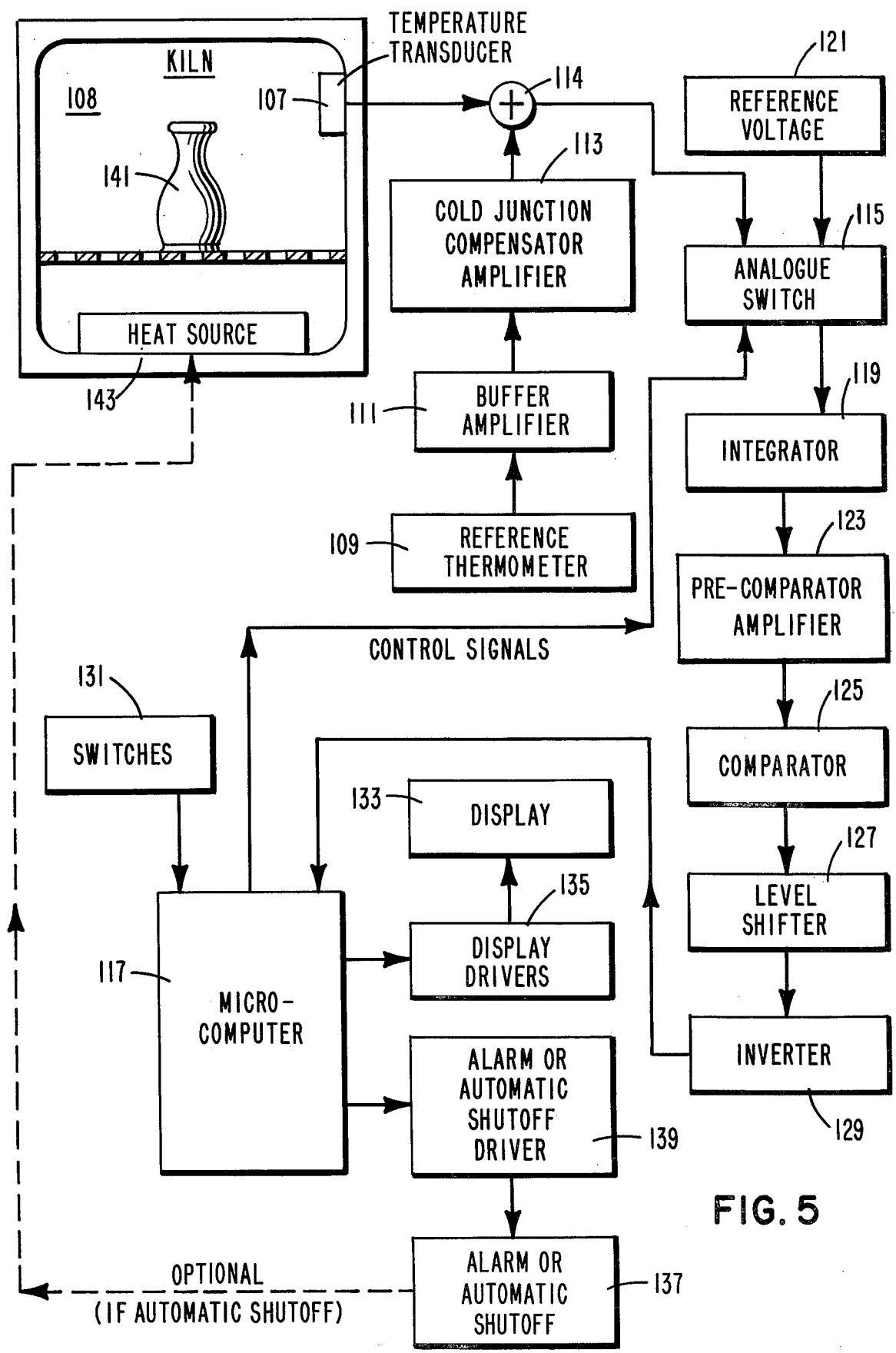
FIG. 5 is a block diagram of the circuit of the present invention.

FIG. 5 is a block diagram illustrating the general arrangement of the heat treatment regulating apparatus. Temperature transducer 107 may be any device capable of providing an electrical signal representive of temperature inside kiln 108, including, as noted above, a thermocouple.

In order to measure the temperature of one junction of a thermocouple, as is well known, the other junction's temperature must be known. In other words, a thermocouple will only indicate a difference in temperature between its two junctions. The present invention employs reference thermometer 109, measuring the ambient temperature near the heat treatment regulating apparatus, as an electronic compensator for the absent thermocouple junction. The signal from this reference thermometer is amplified by buffer amplifier 111 and then by "cold junction compensator" amplifier 113, at which point the signal is adjusted to the value of the ambient temperature. The electrical connections between the temperature transducer and the cold junction compensator are such that their output voltages are added as shown by summing junction 114.

The inputs to integrator 119 are controlled by analogue switch 115 which, in turn, is operated by microcomputer 117. After the zeroing voltage (not shown in FIG. 5) is applied to both inputs of integrator 119 for 100 ms, the microcomputer instructs analogue switch 115 to apply first the temperature voltage and then the reference voltage 121 to the integrator's negative input. The consequences of applying these various voltages to the integrator's input have been described above in connection with FIG. 4. Integrator output voltage is amplified by precomparator amplifier 123 and then by comparator 125, whose output signal is used, after correction of its polarity and voltage level, by microcomputer 117 to determine when to start and stop counters T0 and T1. Level shifter 127 and inverter 129 adjust the parameters (voltage level and polarity) of the comparator output signal to be compatable with the logic of the microcomputer.

Switches 131 are used both to turn the heat treatment regulating apparatus on and off and to adjust the selected cone number up or down. Their positions are read directly by the microcomputer, which takes the appropriate action.

Output of the microcomputer is in two forms: display and either alarm or automatic shutoff of the kiln (or both). During operation of the heat treatment regulating apparatus, numerical display 133 continuously shows the kiln temperature in degrees Celsius, and the selected cone number. Temperature can be displayed in degrees Fahrenheit, if desired, simply by actuating one of switches 131. The display is powered by display drivers 135 and updated every millisecond. When the microcomputer decides that the ceramic article being heated has received the proper amount of heat treatment, it may actuate either an alarm or an automatic shutoff device 137 (the latter functioning to shut off heat to the kiln). The alarm or automatic shutoff is powered by a suitable driver 139. If automatic shutoff device 137 is employed to shut off heat to kiln 108 when the maturation temperature of ceramic article 141 has been reached, device 137 is connected, in a conventional manner, to the kiln's heat source 143. For example, an electrically-powered kiln could use, as the automatic shutoff device, a normally-closed relay in series with the electrical heating elements. A gas-powered kiln might employ an electrically-operated valve in the gas supply line.

The circuitry will now be described, with reference to FIGS. 6 and 7, which together form a single schematic diagram of the preferred embodiment. Beginning at the upper left of FIG. 6, switches 131 receive power through terminal 201 and, when actuated, ground the ends of biasing resistors 203. As shown, the switches are normally open and may be of any suitable type, including both locking and momentary-contact. Of the four momentary-contact switches illustrated, one is used to turn the heat treatment regulating apparatus on, another to turn it off, and the remaining two to raise or lower the selected cone number. The locking switches change the display from Celsius to Fahrenheit, and provide inputs for altitude and humidity. Crystal 205, connected directly to the microcomputer 117, is the frequency standard for the computer's clock. The main power supply for the computer is connected to terminal 207 and filtered by capacitor 209.

The display output of the microcomputer 117 is divided into two parts in the preferred embodiment. Coded display instructions exit the microcomputer via two sets of lines 211 and 213 and are decoded by two integrated circuits 215 and 217. Because the display in the preferred embodiment includes eight numerical digits, display drivers 135 are a set of eight transistors, each driving one of the digits. Encoded digit signals from lines 211, after decoding, are directed by integrated circuit 215 to the appropriate digit driver by way of one of the biasing resistors 219. Display 133 consists of eight seven-segment numeral displays, corresponding segments of which are connected in parallel. Integrated circuit 217 therefore determines which segment of the digit selected by integrated circuit 215 will be activated, in accordance with the encoded segment instructions received on lines 213.

Figure 6:
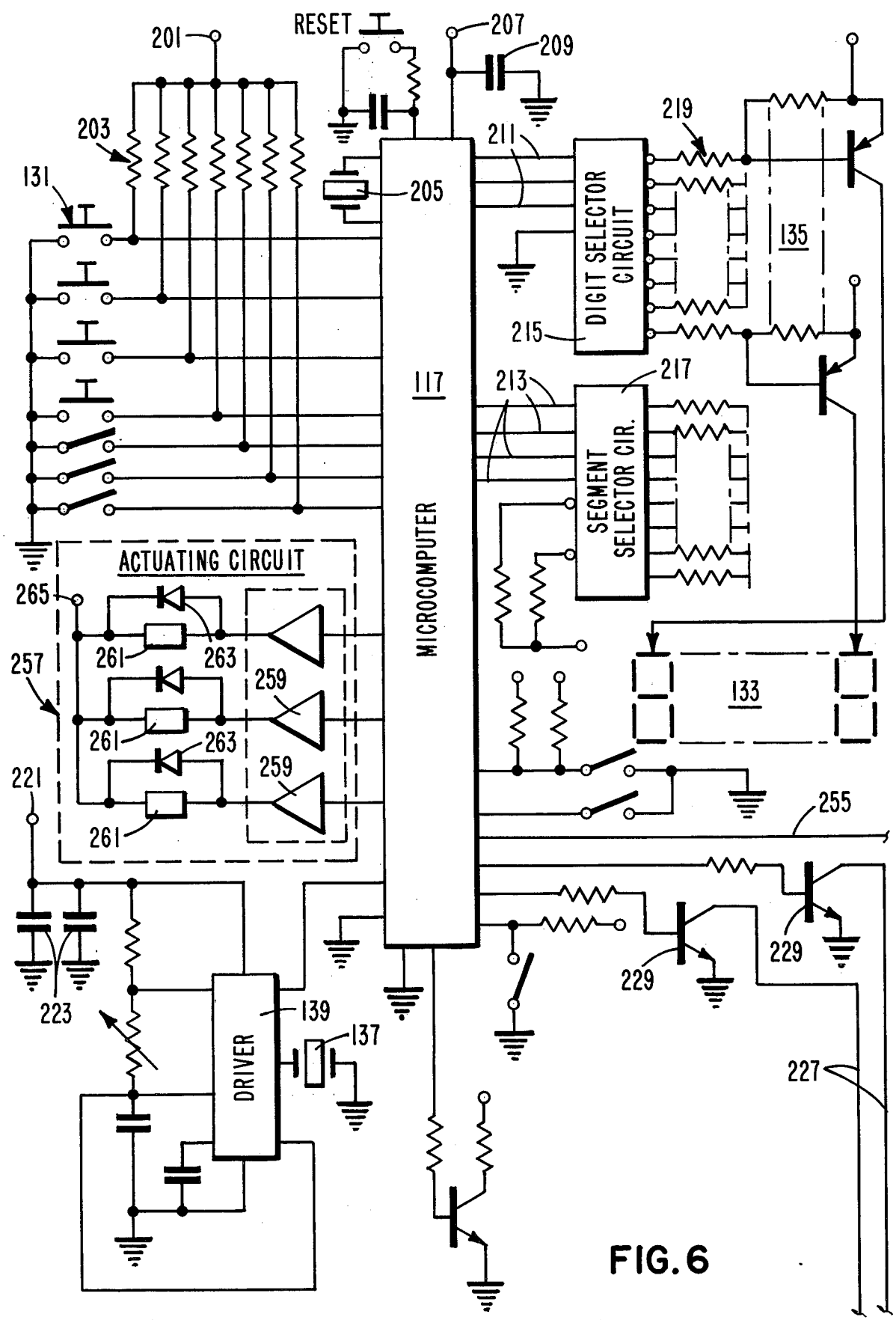
FIGS. 6 and 7 together form a schematic diagram of the preferred embodiment of the present invention.

The other output of the microcomputer 117, which in this case is an alarm 137, is shown at the lower left of FIG. 6. (Although the alarm is described as a piezoelectric noisemaker, it will be appreciated that any suitable signalling means may be used.) Power for the alarm driver 139 is supplied through terminal 221 in parallel with filtering capacitors 223.

Figure 7:
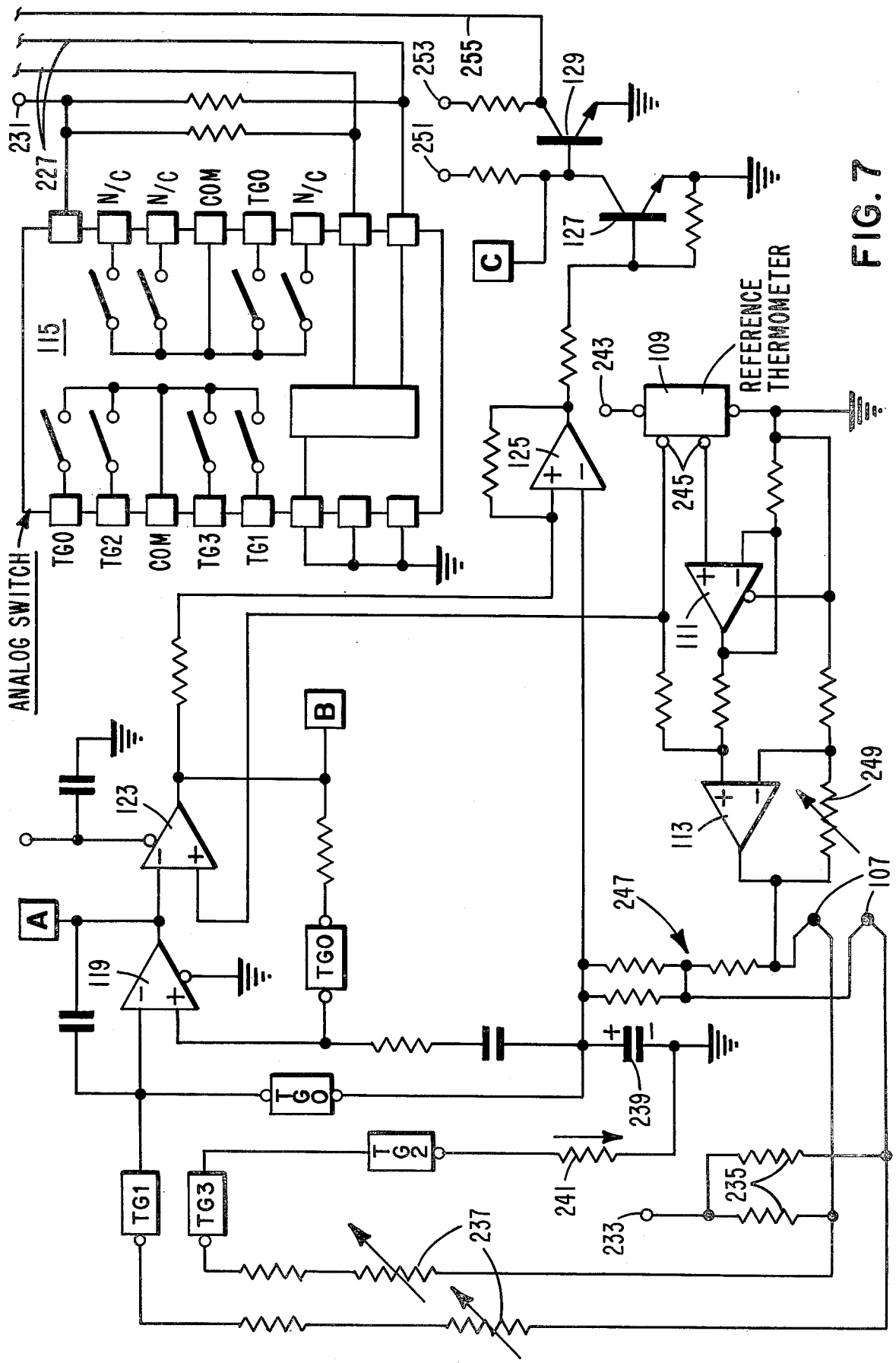

The analogue switch 115, shown at the upper right of FIG. 7, receives switching instructions from microcomputer 117 over two lines 227 via transistors 229 which act as level shifters and inverters, changing the level and polarity of the signal leaving the microcomputer to be compatable with the analogue switch 115. Upon receipt of the appropriate signal from microcomputer 117, analogue switch 115 selects TG0, TG1, TG2 or TG3 to be switched into its common terminals, as will be further illustrated in connection with FIG. 7. Analogue switch 115 receives power through terminal 231.

At the bottom of FIG. 7 are shown two temperature transducers 107, in this case thermocouples, connected in parallel. Because the microcomputer 117 is capable of instructing analogue switch 115 to apply the output of a selected thermocouple to the integrator, both thermocouples may remain connected at all times, the selection between them being made by appropriate programming. In the event a thermocouple is broken or missing, power from terminal 233 is applied through one of resistors 235 to the input of the integrator, causing the "open thermocouple" indication. The thermocouple output signal is applied to the input of integrator 119 by way of variable compensating resistors 237 and the analogue switch (which is shown as its functional components TG0, TG1, TG2 and TG3). TG1 is the section of the analogue switch which applies the output of the lower thermocouple to integrator 119, while TG3 controls the output of the upper thermocouple. The negative reference voltage which is applied to the input of the integrator through section TG2 of the analogue switch comes from capacitor 239 via resistor 241.

Integrated circuit 109, a reference thermometer, receives power through terminal 243 to produce at its output terminals 245 a reference voltage representative of the ambient temperature. The reference voltage is then amplified by buffer amplifier 111 and by cold junction compensator amplifier 113 before being added to the thermocouple signal at network 247. Variable resistor 249 is used to calibrate the output of the cold junction compensator amplifier.

After integration in integrator 119, the signal (either thermocouple voltage, reference voltage, or zero) is amplified by pre-comparator amplifier 123 and comparator 125 before being acted upon by level shifter 127 and inverter 129. Power for level shifter 127 is supplied through terminal 251; while power for inverter 129 arrives through terminal 253. The inverter's output, on line 255, is sent to microcomputer 117 to signal the starting and stopping of counters T0 and T1. The letters A, B, and C in FIG. 7 correspond to the three voltage wave forms in FIG. 4.

An optional feature of the present invention is shown generally as actuating circuit 257 in FIG. 6. Within the dashed lines are three amplifiers 259 connected to microcomputer 117, a relay 261 connected to the output of each amplifier 259, a diode 263 in parallel with each relay 261, and a power supply terminal 265 connected to the outputs of the relays. Microcomputer 117 may be programmed to switch relays 261, through amplifiers 259, to operate external equipment related to the firing operation. For example, a relay 261 may be used, as described above, to switch off the kiln's electrical heating elements upon command by the microcomputer. Furthermore, although it is not necessary when the present invention is used, a constant rate of temperature increase may be provided by switching electrical heating elements on and off at appropriate times. Circuit 257 may also be used to soak the ceramic article when it reaches a maturation temperature or to automatically shut off the kiln at a predetermined maximum temperature or after a predetermined maximum "on" time.

Figure 8:
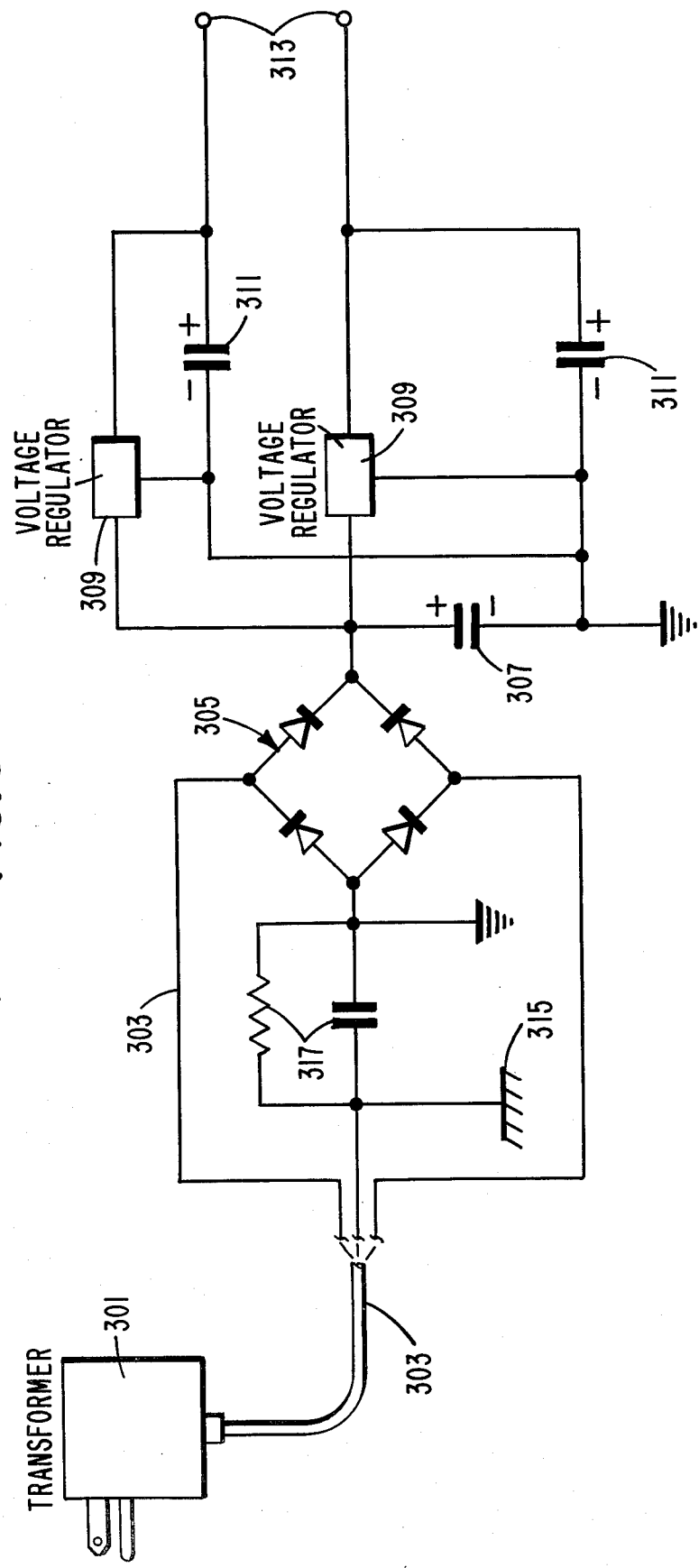
FIG. 8 is a schematic diagram of a power supply suitable for use with the present invention.

FIG. 8 shows a power supply suitable for use with the preferred embodiment of the present invention. A wall-mounted step-down transformer 301 is connected by power lines 303 to full-wave bridge 305, which is located on one of the printed circuit boards of the heat treatment regulating apparatus. The bridge's rectified output is then connected, via a filtering capacitor 307, to two voltage regulators 309 corresponding to two separate desired output voltages. The output of voltage regulators 309 is again filtered, by filtering capacitors 311, before being supplied to output terminals 313. The ground side of the bridge output is connected through RC filter 317 to the case 315 enclosing the heat treatment regulating apparatus.

E. Summary

Although it is believed that the foregoing description adequately explains the invention to one of ordinary skill in the art, its construction and operation will be briefly reviewed. The present invention can substitute for pyrometric cones in any periodic kiln used for firing ceramics. The only required connections with the kiln are the temperature transducer, which produces an electrical signal representative of the temperature inside the kiln, and the optional automatic shutoff, which shuts down the kiln's heat source if the automatic shutoff feature is desired.

When the kiln is loaded with a piece of ceramic ware and initially heated, the heat treatment regulating apparatus is also started, by actuating the appropriate switch. Thereafter, the temperature transducer continually supplies an analogue signal representing the interior temperature of the kiln. To compensate for the thermocouple cold junction, a reference thermometer supplies ambient temperature signals through a buffer amplifier and a cold junction compensator amplifier. The ambient temperature signal is added to the thermocouple signal before processing.

About every half second the thermocouple's analogue signal is converted to a digital value by means of two counters in the microcomputer. The integrator is zeroed for 100 ms; then the positive thermocouple voltage is applied to it for 200 ms; finally, a constant negative reference voltage is input to the integrator. When this happens, the microcomputer starts the two counters. If the thermocouple is in place, a Zero Crossing Interrupt will stop the counters when integrator output voltage passes through zero. The count is then translated into a temperature reading.

The microcomputer is informed of the integrator output voltage only after it has passed through a series of circuits. This voltage is amplified by a pre-comparator amplifier and by a comparator. Next, its level is shifted and its polarity is reversed before it is finally sent to the microcomputer. There, it signals the start and stop of counters T0 and T1.

Every 1½ minutes, the temperature readings in the microcomputer's temperature shift register are updated by shifting in the latest value. At the same time, the rate of temperature rise is calculated; and the rate shift register is also updated. Finally, smoothed rate of temperature rise is calculated by averaging the oldest four rate values. Using smoothed rate of rise as the independent variable, the microcomputer calculates maturation temperature from the generalized linear equation (Equation (2) above), using the stored values of slope, m, and y-intercept, k, for the selected cone. If the present temperature is not less than the calculated maturation temperature, the microcomputer either causes an alarm to be sounded or shuts off heat to the kiln.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention.

I claim:

1. A method of efficiently heating a ceramic object to a state of maturation, said method comprising the steps of:

storing a known relationship between maturation temperatures and rates of temperature increase for the ceramic object;

applying sufficient heat to the ceramic object to raise its temperature;

measuring a first temperature of the object;

measuring a second temperature of the object at a known interval after measuring the first temperature;

calculating a rate of temperature increase between the first and second temperatures;

storing the rate of temperature increase;

periodically repeating said steps of measuring a second temperature, calculating the rate of temperature increase, and storing the rate;

using the stored rates in conjunction with the known relationship to determine a maturation temperature; and ceasing to apply sufficient heat to the ceramic object to raise its temperature when the second temperature first equals or exceeds the maturation temperature.

2. A method as claimed in claim 1 further comprising the initial steps of:

storing a plurality of relationships between maturation temperatures and rates of temperature increase corresponding to a plurality of ceramic objects; and selecting the one of the relationships which corresponds to the ceramic object being heated.

3. A method as claimed in claim 1 wherein said step of using the stored rates in conjunction with the known relationship comprises the steps of:

calculating a rate of change of the stored rates of temperature increase;

deriving a representative rate of temperature increase from the stored rates of temperature increase;

adjusting the derived rate of temperature increase in accordance with the rate of change; and comparing the adjusted rate to the known relationship to determine a maturation temperature.

4. A method as claimed in claim 1 wherein said step of using the stored rates in conjunction with the known relationship comprises the steps of:

calculating a rate of change of the stored rates of temperature increase;

deriving a representative rate of temperature increase from the stored rates of temperature increase;

comparing the derived rate to the known relationship to determine an unadjusted maturation temperature; and adjusting the unadjusted maturation temperature in accordance with the rate of change to determine a maturation temperature.

5. A method of efficiently heating a ceramic object to a state of maturation, said method comprising the steps of:

storing a known relationship between maturation temperatures and rates of temperature increase for the ceramic object;

applying sufficient heat to the ceramic object to raise its temperature;

measuring a first temperature of the object;

measuring a second temperature of the object at a known interval after measuring the first temperature;

calculating the average rate of temperature increase between the first and second temperatures;

comparing the rate of temperature increase to the known relationship to determine a maturation temperature;

periodically repeating said steps of measuring first and second temperatures, calculating the rate of temperature increase, and comparing the rate to the known relationship; and ceasing to apply sufficient heat to the ceramic object to raise its temperature when the second temperature first equals or exceeds the maturation temperature.

6. A method of efficiently heating a ceramic object to a state of maturation, said method comprising the steps of:

storing a known relationship between maturation temperatures and rates of temperature increase for the ceramic object;

applying sufficient heat to the ceramic object to raise its temperature;

measuring a first temperature of the object;

measuring a second temperature of the object at a known interval after measuring the first temperature;

calculating the average rate of temperature increase between the first and second temperatures;

comparing the rate of temperature increase to the known relationship to determine a maturation temperature;

measuring a third temperature of the material;

periodically repeating said steps of measuring first, second and third temperatures, calculating the rate of temperature increase, and comparing the rate to the known relationship; and ceasing to apply sufficient heat to the ceramic object to raise its temperature when the third temperature first equals or exceeds the maturation temperature.

7. A method as claimed in claim 6 further comprising the initial steps of:

storing a plurality of relationships between maturation temperatures and rates of temperature increase corresponding to a plurality of ceramic objects; and selecting the one of the relationships which corresponds to the ceramic object being heated.

8. In a periodic kiln having heating means operable for raising the interior temperature of the kiln and temperature measuring means for detecting the interior temperature of the kiln, a method of maturing a ceramic object comprising the steps of:

storing a known relationship between maturation temperatures and rates of temperature increase for the ceramic object;

operating the heating means;

detecting a first temperature with the measuring means;

detecting a second temperature with the measuring means at a known interval after detecting the first temperature;

calculating the average rate of temperature increase between the first and second temperatures;

comparing the rate of temperature increase to the known relationship to determine a maturation temperature;

detecting a third temperature of the material with the measuring means;

periodically repeating said steps of detecting first, second and third temperatures, calculating the rate of temperature increase, and comparing the rate to the known relationship; and ceasing the operation of the heating means when the third temperature first equals or exceeds the maturation temperature.

9. In a ceramic heat treatment regulating apparatus having a temperature transducer to indicate the temperature of a ceramic material, a microcomputer to store data and to perform arithmetic and logic operations, and an output device to produce a signal, a method of indicating the end point of a ceramic maturing operation, said method comprising the steps of:

storing in the microcomputer a known relationship between maturation temperatures and rates of temperature increase for the ceramic material;

measuring a first temperature of the ceramic material with the temperature transducer;

measuring a second temperature of the ceramic material with the temperature transducer at a known interval after measuring the first temperature;

calculating the average rate of temperature rise, between the first and second temperatures, with the microcomputer;

comparing the rate of temperature increase to the known relationship with the microcomputer to determine a maturation temperature;

measuring a third temperature of the material with the temperature transducer;

periodically repeating said steps of measuring first, second and third temperatures, calculating the rate of temperature increase, and comparing the rate to the known relationship; and signalling the end point with the output device when the third temperature first equals or exceeds the maturation temperature.

10. An apparatus for producing a control signal when the temperature of a ceramic material being heated reaches a maturation temperature representative of proper heat treatment of the material, said apparatus comprising:

memory means for storing a predetermined relationship between maturation temperatures and rates of temperature increase for the ceramic material being heated;

temperature transducer means for indicating the temperature of the ceramic material;

calculating means connected to said memory means and said temperature transducer means for calculating an average rate of temperature increase and for determining from the stored relationship the value of maturation temperature corresponding to the calculated average rate, said calculating means including comparison means for producing a control signal when the temperature of the ceramic material reaches the determined maturation temperature.

11. The apparatus of claim 10 wherein said memory means stores a plurality of predetermined relationships between maturation temperatures and rates of temperature increase corresponding to a plurality of ceramic materials, said apparatus further comprising selection means connected to said calculating means for selecting the one of the predetermined relationships which corresponds to the ceramic material being heated.

12. The apparatus of claim 10 further comprising display means for displaying at least one of the temperatures.

13. The apparatus of claim 10 wherein said calculating means further comprises means for determining a rate of change of the rate of temperature increase and for adjusting the calculated average rate in accordance with the rate of change.

14. The apparatus of claim 10 wherein said calculating means further comprises means for determining a rate of change of the rate of temperature increase and for adjusting the determined maturation temperature in accordance with the rate of change.

15. In a periodic kiln having an enclosure to contain a ceramic article, heating means for raising the temperature of the interior of the enclosure to the extent necessary to provide sufficient heat treatment to mature the article, and temperature transducer means for producing a temperature signal representative of the temperature of the interior of the enclosure, a ceramic heat treatment regulating apparatus for shutting off said heating means when the article has been matured by sufficient heat treatment, said apparatus comprising:

conversion means for converting the temperature signal to a temperature value;

memory means for storing a predetermined relationship between maturation temperatures and rates of temperature increase for the ceramic article being heated;

calculating means connected to said memory means and said conversion means for calculating an average rate of temperature increase and for determining from the stored relationship the value of maturation temperature corresponding to the calculated average rate, said calculating means including comparison means for producing a control signal when the temperature of the ceramic article reaches the determined maturation temperature;

switch means responsive to the control signal for shutting off said heating means.

16. The ceramic heat treatment regulating apparatus of claim 15 further comprising display means for displaying the temperature of the interior of the enclosure.

17. The ceramic heat treatment regulating apparatus of claim 15 wherein the average rate of temperature increase is calculated using temperatures which occurred a predetermined length of time prior to the time of calculation.

* * * * *